United States Patent

Jackson

[15] 3,676,857

[45] July 11, 1972

[54] DATA STORAGE SYSTEMS

[72] Inventor: Howard Rodney Jackson, Hadfield, Hyde, England

[73] Assignee: International Computers Limited, Putney, London, England

[22] Filed: Aug. 12, 1970

[21] Appl. No.: 63,163

[30] Foreign Application Priority Data

Aug. 26, 1969 Great Britain ....................42,337/69

[52] U.S. Cl. ....................340/172.5
[51] Int. Cl. ....................G06f 7/22
[58] Field of Search ....................340/172.5

[56] References Cited

UNITED STATES PATENTS

| | | | |
|---|---|---|---|
| 3,292,152 | 12/1966 | Barton | 340/172.5 |
| 3,387,283 | 6/1968 | Snedaker | 340/172.5 |
| 3,435,423 | 3/1969 | Fuller et al. | 340/172.5 |
| 3,456,243 | 7/1969 | Cass | 340/172.5 |

*Primary Examiner*—Raulfe B. Zache
*Attorney*—Hane, Baxley & Spiecens

[57] ABSTRACT

A system for storing data in which data is read out of and written into a large, addressable, bulk store by means of an immediate access store. An associative store is initially loaded with address information and upon a signal from a central processor unit, the address information is read out of the associative store to a test unit which calculates a desired address in the bulk store. The address is then applied to an address selection circuit which allows data to be read out of or written into a desired storage location in the bulk store.

6 Claims, 2 Drawing Figures

INVENTOR
HOWARD RODNEY JACKSON
BY
Hane, Baxley and Spiecens
ATTORNEYS

DATA STORAGE SYSTEMS

BACKGROUND OF THE INVENTION

This invention relates to data storage systems.

There is an increasing use of random access bulk storage devices, such as large magnetic disc files, in computer systems. It is necessary in general that the amendment of currently stored data records and the addition of new data records should be carried out easily and rapidly. The data records must have meaningful addresses within the storage device to allow reading of any selected record.

The simplest addressing system conists in allocating a block of store for every data record which may be required, the records being arranged in some logical order, such as sequentially by a record reference number. Thus, the reference number of a record is simply related to a block address. There are two disadvantages with such a system. Firstly, a substantial numb .r of data records may not exist at any particular time. If the record reference numbers correspond to sequenced account numbers, it is clear that there will be no data records for accounts which have been closed and for new accounts which have not yet been opened. Secondly, data records tend to differ considerably in length, so that many store blocks will be only partially filled, since the block length must be sufficient to accommodate the longest record.

Various proposals have been made for overcoming the inefficient use of storage which occurs with the simple addressing system. These have been implemented primarily by programming and they can be divided into two broad categories. In the first category, the necessary address information is held in a separate part of the store in the form of a directory. Each directory entry consists of a record identification, such as the record reference addresses, for that record. Thus, a record is obtained from the store by searching sequentially through the directory to find the appropriate record entry and then using the related address information to access the store.

The second category uses some form of randomizing technique to allocate addresses. For example, a sequence of arithmetic operations may be performed on part of the data of the record, the result being used as the address of that record. The technique may produce the same address for several records and it is necessary to check that a calculated address is empty before the record is put in store. If the address is already occupied, an overflow routine is used to determine a new address and to record a pointer in the original address to the new address.

These more advanced techniques can increase considerably the level of utilization of the store. However, it will be appreciated that they entail a substantial expenditure of time in searching and maintaining the directory, or in calculating randomized addresses.

SUMMARY OF THE INVENTION

According to the invention a storage system for data records includes a bulk storage system with a plurality of addressable storage locations for data records, an associative memory system with a plurality of storage locations for storing address information, means for initially storing data records in the bulk storage system, means for storing in the associative memory system a reference indication for each stored record together with information specifying the address location of said record in the bulk storage system, means responsive to an access request relating to at least part of a data record stored in the bulk storage system to interrogate the associative memory system to read out address information relating to the requested record, and means responsive to said read out address information to read out from the bulk storage system the data record specified by the access request.

BRIEF DESCRIPTION OF THE DRAWING

The invention will now be described, by way of example with reference to the accompanying drawing in which.

DESCRIPTION OF THE PREFERRED EMBODIMENT

Figure 1:
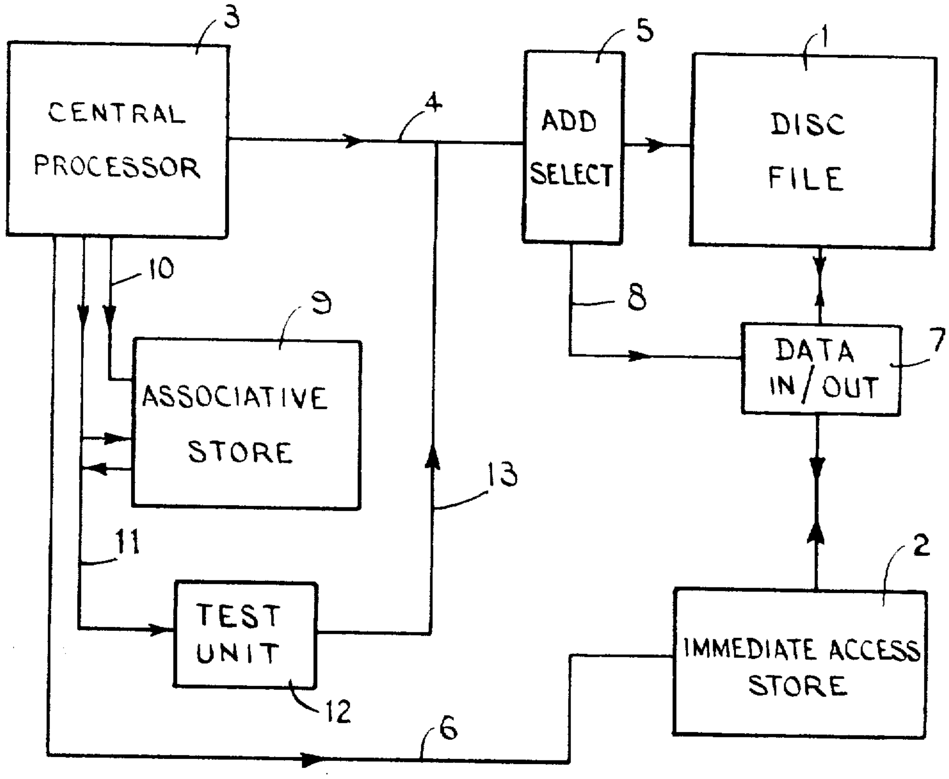
FIG. 1 sows a storage system employing a disc file, in schematic form.

Data records are stored in a bulk storage device in the form of a disc file storage device 1. The disc file 1 is of conventional construction, consisting of a plurality of rotatable magnetic recording discs and associated movable magnetic reading and recording heads. Each provides a plurality of recording tracks, each of which is notionally divided into several sectors. Each sector provides an addressable storage location, the address consisting of a string of digits which specify a particular disc, a track on that disc, and a sector of that track.

A data record to be stored in the disc file 1 may be held temporarily in an immediate access store 2, such as a core matrix, which is associated with a central processor 3. The central processor 3 generates a data transfer instruction which includes the address of the storage location in the disc file 1 at which location recording of the data record is to start. For simplicity of explanation, it will be assumed that the records are recorded sequentially in the disc file 1 and that the central processor 3 holds the address of the last storage location which was used for recording. The start address for the current record will therefore be the next location in the sequence. However, other procedures for determining the starting address may be used, if desired.

The start address is applied over line 4 to address selector 5 to prepare the disc file 1 to receive the data by positioning and/or selecting the appropriate recording head. When this has been completed, a control signal sent over line 6 to the core store 2 causes the read out of the data record to begin. The data is read to a disc input/output unit 7, which also received the necessary sector and other timing signals from the address selector 5 over line 8.

Each data record will usually consist of a large, and variable, number of individual data items. It will be assumed for clarity of description that each item will occupy one storage location. Hence, the position of a data record in the bulk store 1 may be completely specified by listing the addresses of the first and the last storage locations used in recording the data record. Alternatively, the position of the data record may be specified by relative address for the start and finish of the record and the starting address in the bulk store.

If a sequential system is used for loading the data records into the bulk store initially, the store will be densely packed. It may be necessary to amend some of the records at a later time and some such amendments may increase the length of the records. This may be provided for by using chain addressing. In this system, the overflow from the original recording area is recorded in one, or more, physically separate areas of the disc file 1. Reference to the original area produces the address of the first overflow area, the first overflow area includes the address of the second overflow area, and so on. In this way, access may be obtained to the complete record, even though it may be fragmented in the disc file 1.

Concurrently with the transfer of the record from the core store 2 to the disc file 1, the central processor 3 enters the necessary address information into an associative store 9, of conventional construction, over a line 10. Basically, this entry consists of information to identify the record and information to define the address of the record in the bulk store 1. The detailed format of this information may be selected in accordance with the record handling procedures used by the central processor 3. One convenient format is to specify the notional start and ending addresses of a record fragment, the chain address corresponding to the starting address of the next fragment of the file, and the starting address in the bulk store 1 of the record fragment. This is effective if the program controlling the processor 3 is written in a form which identifies a record by reference to its notional addresses. Alternatively, the notional addresses may be supplemented by, or replaced by, another record reference indication, such as a record name or number. Another alternative format consists of the record name, the number of data items contained in previous fragments of the record, the starting and ending addresses in the bulk store of this fragment, and a chain address leading to the next fragment.

Whatever format may be adopted for the entry in the associative store 9, the information in that entry is sufficient to enable any record, or part of a record, including an individual data item in that record, to be recovered from the disc file 1. The appropriate record identifying information for a desired record, or part of a record, is fed over a line 11 from the central processor 3 to the associative store 9. This input information is effectively compared in parallel with the record identifying part of all the entries in the store 9, in known manner, and all entries which are the same as the input information are marked. Examples of associative stores that are suitable for use with the present invention may be found in U.S. Pat. No. 3,339,181 or U.K. Pat. Specification No. 973,866. The marked entries are read out in turn from the store 9 to a test unit 12 v'.ich also receives the input information over line 11. This unit 12 determines the address of the desired data in the disc file 1. For example, if a particular data item is specified, the test unit 12 may determine from the notional addresses which of the record fragments contains the desired item and it then calculates the disc file address of that item. This address is fed over a line 13 to the address selection unit 5, which selects the address and reads out the data from disc file 1 to the store 2 through the input/output unit 7, in a manner analogous to that described in connection with the entry of data.

Figure 2:
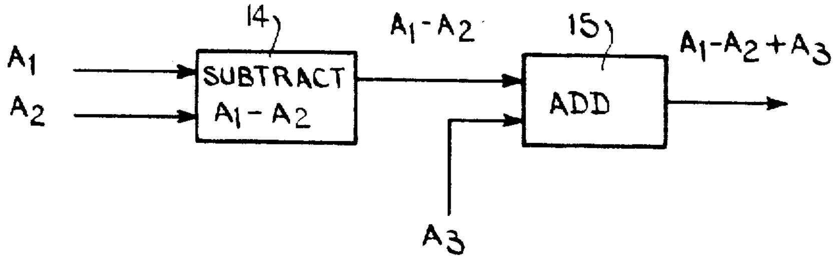
FIG. 2 shows a particular form of a test unit.

The particular operations where are performed by the unit 12 depend on the format of the entries in the store 9 and on the type of selection, e.g. whether a complete file fragment or a particular data item is to be selected. Referring now to FIG. 2, there is shown one form which test unit 12 may take in order to calculate an item address in the bulk store 1. Thus, if the first format described above is in use, the notional address specifies the particular file fragment, so that only one entry in the store 9 is marked. The test unit 12 then calculates the item address by subtracting the notional starting address of the fragments $A_2$ from the notional item address $A_1$ in subtracting circuit 14 and adding the result, $A_1 - A_2$ to the bulk store starting address of the fragment $A_3$. The item address in disc file 1 is then fed to address selection unit 5 over line 13.

It will be appreciated that the substantially instantaneous access to all the record address information in the associative store 9, together with the simplicity of any address calculation carried out by the unit 12, provide access to any part of the bulk store 1 in a time which is very much less than that which can be achieved by prior systems for the same basic access times for the disc file 1 and core store 2.

The example described has referred to the use of a disc file 1 as the bulk store and a core store as the immediate access store 2. However, other forms of store may be used to provide comparable facilities. For example, the bulk store 1 could be a magnetic drum or a large, relatively slow, core matrix, and the immediate access store could use thin magnetic film or semiconductors. The associative store 9 may be available to several processors in a multiplexed mode to provide bulk storage in a multiprocessor system. Also, any one of a number of well-known circuits may be employed as subtracting circuit 14 or adding circuit 15.

I claim:

1. A digital system for storing data records including a bulk storage system with a plurality of addressable storage locations for data records; an associative memory system with a plurality of addressable storage locations for storing address information characteristic of each of the data records stored in the bulk storage system; means for storing data records in the bulk storage system; means for concurrently storing in the associative memory system address information characteristic of each bulk storage location having a data record stored therein; means responsive to an access request relating to at least part of a data record stored in the bulk store to interrogate only the associative memory system to provide the address information of the reqested data record stored in the bulk storage system; and means responsive to the address information provided by the associative memory to read out from the bulk storage system the data record specified by the access request.

2. A system as claimed in claim 1 in which said means responsive to said information provided by the associative memory system includes a test unit which receives said address information relating to the requested data record as an input and an address selection circuit which is responsive to the output of said test unit to select a storage location in said bulk storage system.

3. A system as claimed in claim 2, in which said test unit includes; means for receiving as a first input said access request; means for receiving as a second input said address information provided by the associative memory system; and means for deriving from said first and second inputs an output comprising the address in said bulk storage system corresponding to said address information provided by the associative memory system.

4. A system as claimed in claim 3 in which said means for storing data records in the bulk storage system includes an immediate access store and a data input/output device, the output of said immediate access store being applied through said data input/output device to said bulk storage system.

5. A system as claimed in claim 3 in which the test unit includes means to calculate an address in said bulk storage system from the address information read out of the associative memory.

6. A system as claimed in claim 3, in which the test unit includes means to compare the information read out of the associative memory system relating to a specified address location in the bulk storage system, and an input from a central processing unit to produce the output from the test unit.

* * * * *